(12) United States Patent
Tistchenko (10) Patent No.: US 6,328,063 B1
(45) Date of Patent: Dec. 11, 2001

(54) FUEL DRAWING DEVICE FOR MOTOR VEHICLE TANK

(75) Inventor: Michel Tistchenko, Margny les Compiègnes (FR)

(73) Assignee: Marwal Systems (FR)

( * ) Notice: Subject to any disclaimer, the term of this patent is extended or adjusted under 35 U.S.C. 154(b) by 0 days.

(21) Appl. No.: 09/462,153

(22) PCT Filed: Jul. 1, 1998

(86) PCT No.: PCT/FR98/01404

§ 371 Date: Jan. 3, 2000

§ 102(e) Date: Jan. 3, 2000

(87) PCT Pub. No.: WO99/01658

PCT Pub. Date: Jan. 14, 1999

(30) Foreign Application Priority Data

Jul. 3, 1997 (FR) .................................................. 97 08417

(51) Int. Cl.[7] .................................................. F02M 37/14
(52) U.S. Cl. .............................. 137/565.22; 137/565.34; 123/514
(58) Field of Search ........................ 137/565.22, 565.34, 137/574, 576; 123/509, 510, 514

(56) References Cited

U.S. PATENT DOCUMENTS

| 5,070,849 | * | 12/1991 | Rich et al. ............................ 123/509 |
| 5,341,842 | * | 8/1994 | Chih et al. ............................ 137/574 |
| 5,699,773 | * | 12/1997 | Kleppner et al. ..................... 123/510 |
| 5,782,223 | * | 7/1998 | Yamashita et al. ................... 123/510 |
| 5,785,032 | * | 7/1998 | Yamashita et al. ................... 123/509 |
| 5,875,816 | * | 3/1999 | Frank et al. ...................... 123/510 X |

FOREIGN PATENT DOCUMENTS

| 4402224 | 7/1995 | (DE) . |
| 4414281 | 10/1995 | (DE) . |
| 19535668 | 3/1996 | (DE) . |
| 4433301 | 3/1996 | (DE) . |
| 2304821 | 3/1997 | (GB) . |

* cited by examiner

Primary Examiner—John Rivell
(74) Attorney, Agent, or Firm—Blakely Sokoloff Taylor & Zafman (57) ABSTRACT

The invention concerns a fuel drawing device for a motor vehicle tank comprising a housing (100) bearing a drawing pump (190) and a filter (180) arranged on the pump (190) outlet conduit, characterized in that the filter is ring-shaped and is arranged in a chamber radially external to the housing (100) and the pump (190) is arranged in the filter (180) central space.

14 Claims, 9 Drawing Sheets

FUEL DRAWING DEVICE FOR MOTOR VEHICLE TANK

The present invention relates to the field of devices for withdrawing fuel for motor vehicle tanks.

Numerous types of device have already been proposed for this purpose.

The present invention is now aimed at proposing a new type of fuel-drawing device with better properties than the known devices.

This aim is achieved according to the present invention by virtue of a fuel-drawing device for a motor vehicle tank, of the type comprising a housing which bears a withdrawing pump and a filter placed on the pump outlet, characterized in that the filter is annular in shape, that it is arranged in a chamber radially external to the housing, that the pump is associated with a vibration damper, and the pump and the vibration damper are arranged in the central space of the filter, and the housing has a nozzle which communicates with the inlet to the filter and which controls a jet pump designed to fill a reserve bowl associated with the pump.

This arrangement in particular allows a very large filter to be fitted, offering the device a long life.

Other features, aims and advantages of the present invention will become apparent from the detailed description which will follow and from studying the appended drawings which are given by way of nonlimiting example and in which.

the appended

The pumping assembly according to the present invention and illustrated in the appended figures comprises a housing 100 connected to a base 200 by posts 300.

The housing 100 essentially houses an electric pump 190 and a filter 180.

The base 200 is intended to be fixed to a wall of the fuel tank, preferably to the upper wall thereof.

The base 200 supports an electrical connector 210 which powers the electric pump 190 (ground and positive supply terminal) and allows the output terminals of a gauging device 400 to be connected to an external processing circuit (not depicted in the figures).

The base 200 additionally bears a rigid nozzle 220, molded integrally, connected to the outlet of the pump 190 via the filter 180 and intended to take a pipe connected to the site where the fuel will be used (the injectors).

The nozzle 220 is connected to the outlet of the pump 190 via the filter 180 by a flexible pipe 230.

Furthermore, the base 200 bears a pressure-reducing regulator 240. The function of this pressure-reducing regulator 240 is to keep the fuel pressure in the pipe connected to the nozzle 220 constant. To do this, the pressure-reducing regulator 240 has one inlet connected to the nozzle 220 and an outlet which communicates with a network of passages 250 formed in the base 200. This network of passages is itself connected to a pipe 260, the lower end of which opens above the height of the housing 100 so that excess fuel leaving the regulator 240 via the pipe 260 is recovered by the housing 100.

The pressure-reducing regulator 240 may be embodied in numerous ways known per se. It will therefore not be described in detail hereinafter. Essentially, the regulator 240 has a valve inserted between its inlet and its outlet and controlled by a diaphragm subjected to the pressure obtaining in the nozzle 220. When the pressure in the nozzle 220 exceeds a given threshold the aforementioned diaphragm opens the associated valve and the excess fuel flows to the outlet of the regulator and from there to the housing 100 via the pipe 260. When the pressure in the nozzle 220 is below the aforementioned threshold, the valve remains closed, preventing any flow of fuel between the inlet and the outlet of the regulator 240.

The overall structure of the base 200 is conventional in itself and will therefore not be described further in detail hereinafter.

There are preferably two posts 300 providing the connection between the base 200 and the housing 100. These posts 300 are vertical and diametrically opposed with respect to the central vertical axis O—O of the housing 100.

The function of the posts 300 is to allow vertical deflection between the base 200 and the housing 100 so that the housing 100 constantly rests on the bottom of the tank regardless of the deformation of the bottom wall thereof.

For that, according to the embodiment illustrated in the appended figures, each post 300 is formed of a vertical pillar 310 molded integrally on the underside of the base 200, and of a complementing sleeve 320, which houses the corresponding associated pillar 310 and is molded integrally on the housing 100, more specifically on the top face of a cover 110 thereof.

As a preference, springs 330 are inserted between each pillar 310 and the associated sleeve 320, to urge the housing 100 toward the bottom of the tank.

Structures 340 for clipping together the pillars 310 and the sleeves 320 may be provided so as to limit the permitted deflection between the base 200 and the housing 100 so that these items form a single module.

The housing 100 has a body 120 surmounted by a cover 110 and which is fixed to a lower bowl 130.

The housing body 120 and the cover 110 together define an annular chamber which takes the filter 180.

For that, the body 120 has the shape of an annular dish which is open at the top, while the cover 110 has the shape of an annular dish which is open at the bottom.

The body and the cover 110 each have an outwardly projecting flange 122, 124; 112, 114 running around their opening, either on their radially external surface or on their radially internal surface.

These flanges 122 and 112, 124 and 114 are connected together in pairs to seal the internal chamber defined by the body 120 and the cover 110.

As a preference, the cover 110 and the body 120 are connected together by vibration welding, the cover 110 and the body 120 being produced by molding from plastic (as, incidentally, are the base 200 and the bowl 130).

Figure 7:
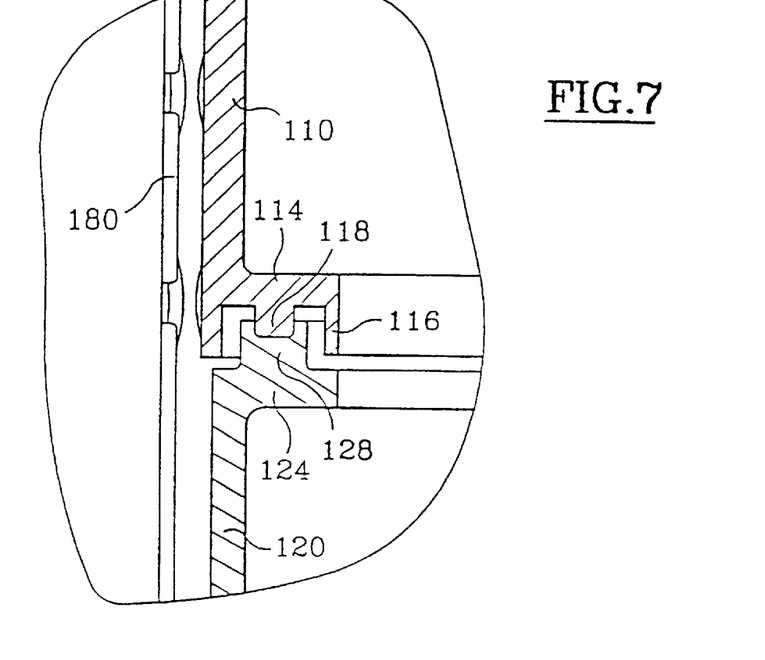
FIG. 7 depicts a part view in vertical section of the housing according to the present invention, illustrating a weld providing the connection between the cover and the body of the housing.

More specifically still, to achieve this vibration weld between the body 120 and the cover 110, one of these items is preferably, as illustrated in FIG. 7, equipped with an annular groove 116 with an annular rib 118 at its center, while the other element is equipped with an annular rib 128 which complements the rib 118. Thus, it is the tops of the ribs 118 and 128 which are vibration-welded together.

A connection of this type by welding between the cover 110 and the body 120 makes it possible to obtain a perfect seal between these elements, without the need for additional parts, such as sealing gaskets.

Furthermore, the aforementioned weld region is preferably located approximately mid-way up the housing formed by the cover 110 and the body 120. The inventors have noticed that this arrangement corresponded to the best weld strength under the stresses exerted.

According to the embodiment of FIG. 7, the groove 116 is made in the cover 110, while the rib 128 is provided on the body 120. However, the opposite arrangement could be adopted.

The filter 180 has an annular shape. It is placed in the chamber defined by the body 120 and the cover 110.

More specifically still, the filter 180 comprises a radial-flow filter element 182 placed between an upper end plate 184 and a lower end plate 186.

Sealing between the upper end plate 184 and the internal surface of the top face of the cover 110 is provided by an annular seal 185, for example an annular seal with two lips.

Sealing between the bottom end plate 186 and the base of the body 120 is provided by an annular seal 187, for example an O-ring.

The inlet to the filter 180 is defined by the radially external surface thereof, which communicates with a chamber 181 formed between this radially external surface of the filter and the body-120/cover-110 assembly.

The outlet of the filter 180 is defined by the radially internal surface thereof, which communicates with a chamber 188 formed between this radially internal surface of the filter 180 and the body-120/cover-110 assembly.

The inlet chamber 181 is connected to the outlet of the pump 190 by a flexible pipe 192. More specifically, this flexible pipe 192 is fitted onto a rigid nozzle 111 molded integrally on the upper surface of the cover 110 and which itself communicates with the chamber 181.

The outlet chamber 188 is connected to the aforementioned pipe 230.

More specifically, to achieve that, the pipe 230 is fitted onto a rigid nozzle 113 molded integrally on the upper surface of the cover 110 and which itself communicates with the chamber 188.

The nozzles 111 and 113 open into the chamber formed by the body 120 and the cover 110, on each side of the seal 185, respectively.

Thus, fuel from the pump arrives at the chamber 181 through the pipe 192, passes radially toward the inside of the filter 180, reaches the chamber 188, and from there arrives at the outlet nozzle 220 via the pipe 230.

It will be noted that in this way, in the context of the present invention, the filter 180 of annular geometry is arranged in a chamber which is radially external to the housing 100, which in particular allows the fitting of a very large filter 180, offering the device a long life.

Figure 1:
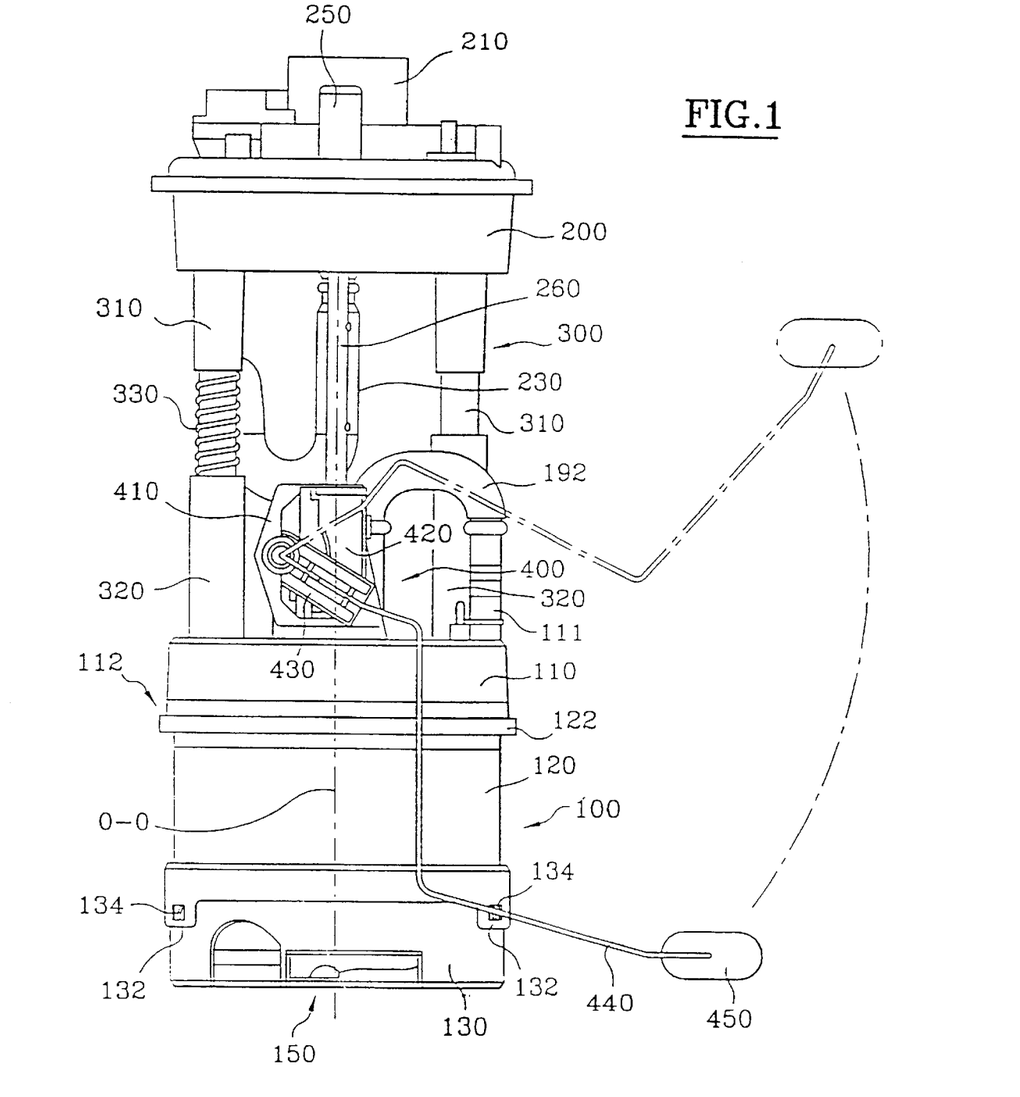
FIG. 1 depicts an external side view of a device according to the present invention.
Figure 2:
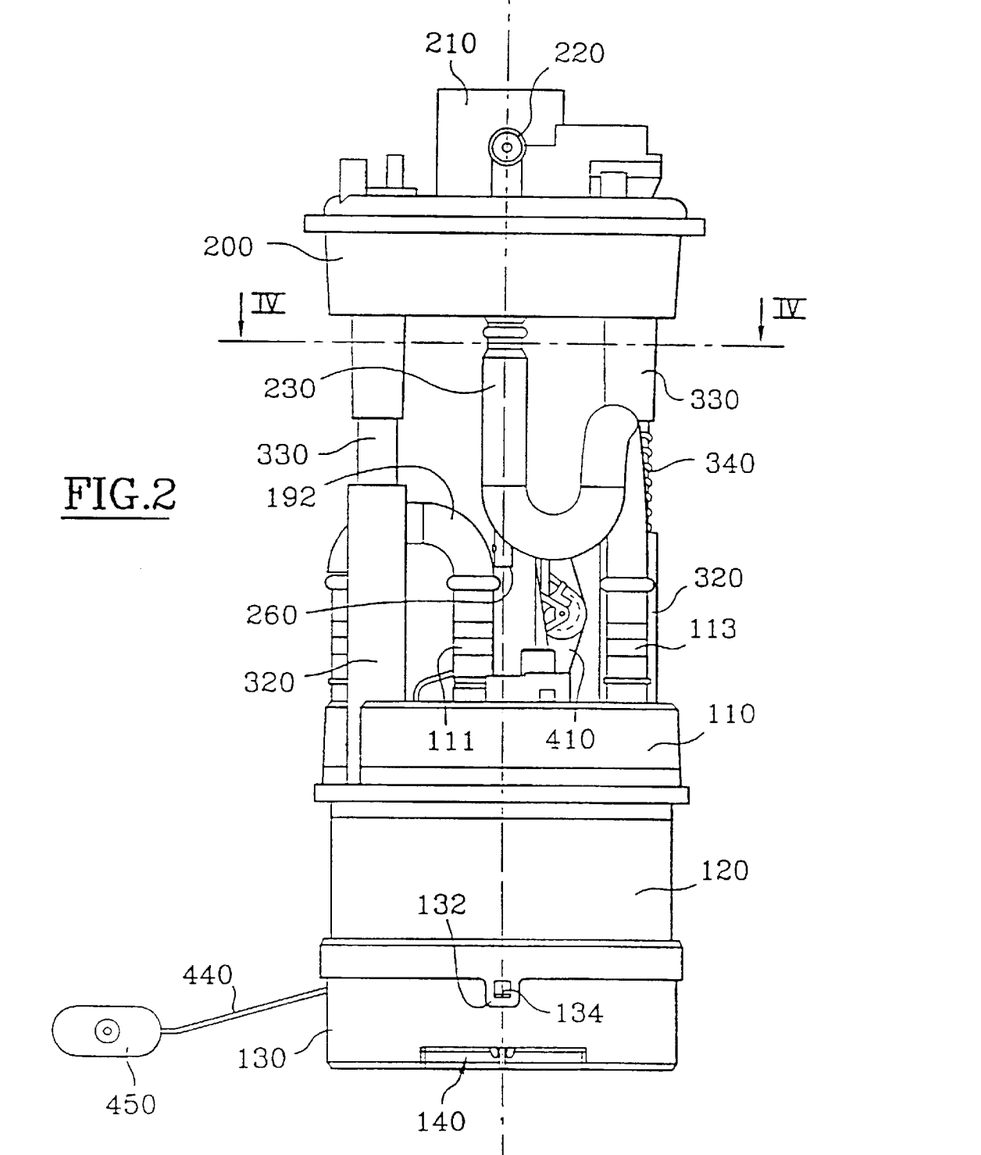
FIG. 2 depicts the opposite external side view of the same device.
Figure 3:
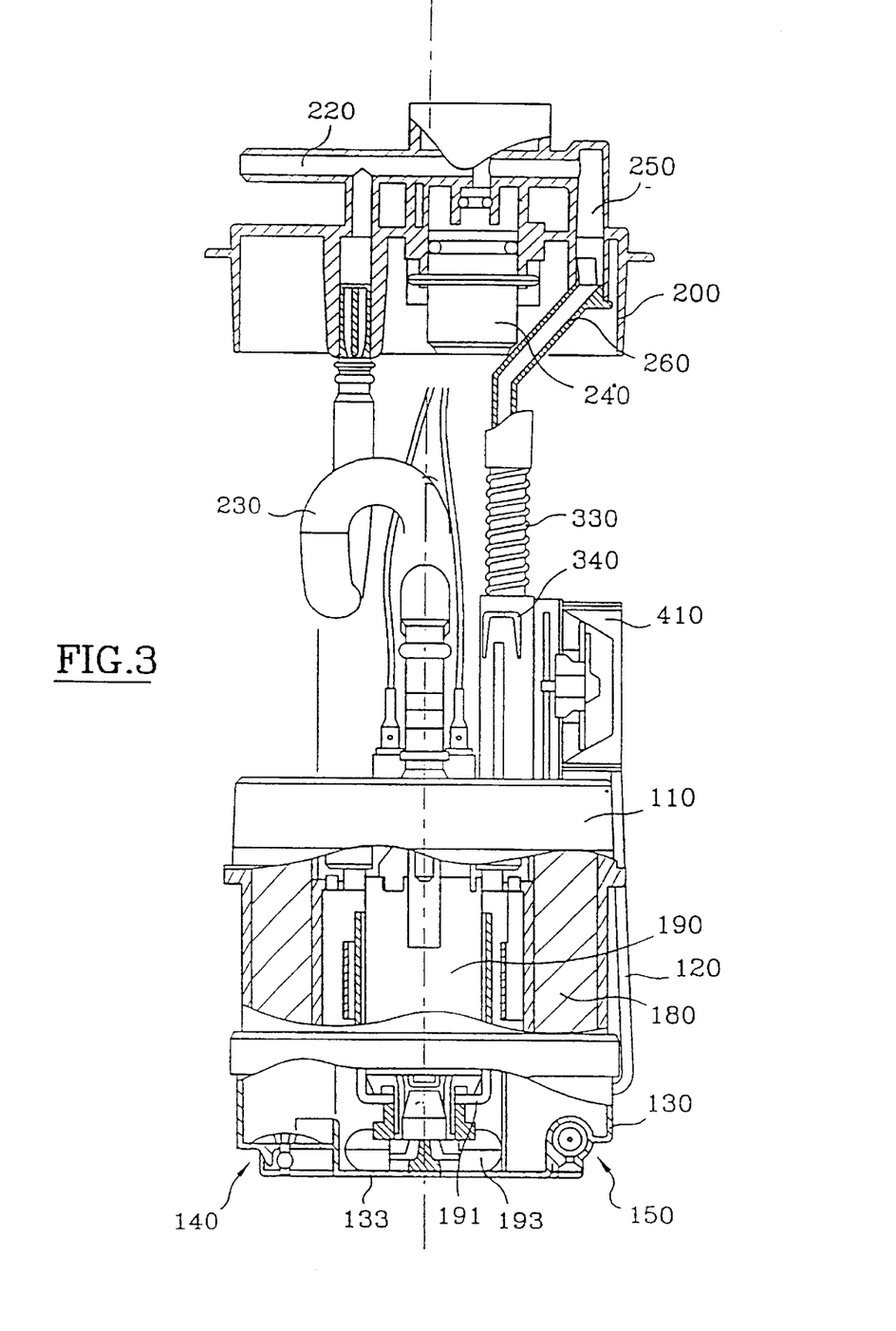
FIG. 3 depicts a view in vertical part section of the same device on a cutting plane orthogonal to the views of FIGS. 1 and 2.
Figure 4:
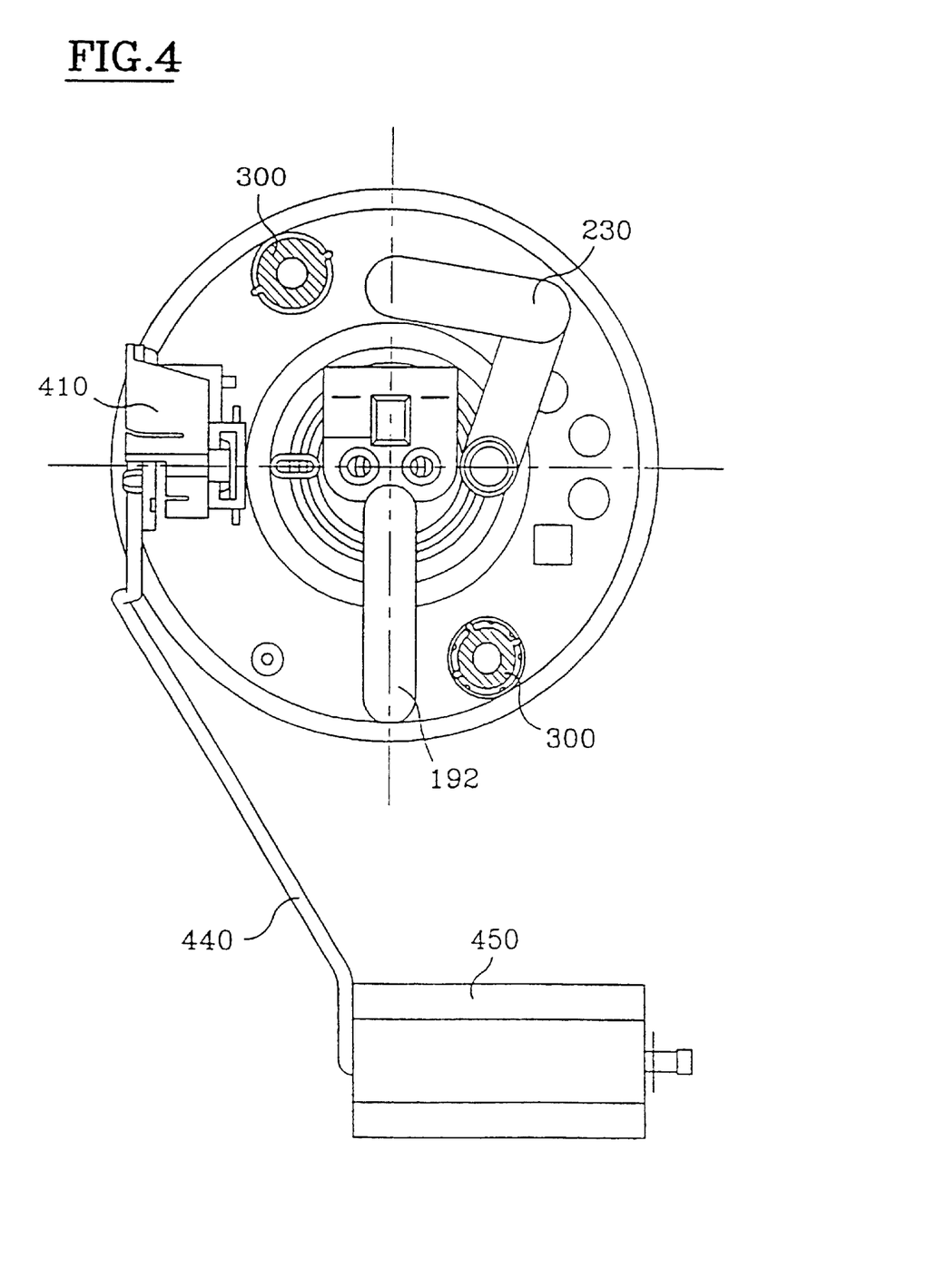
FIG. 4 depicts a view in cross section of this device, on the cutting plane referenced IV—IV in FIG. 2.
Figure 5:
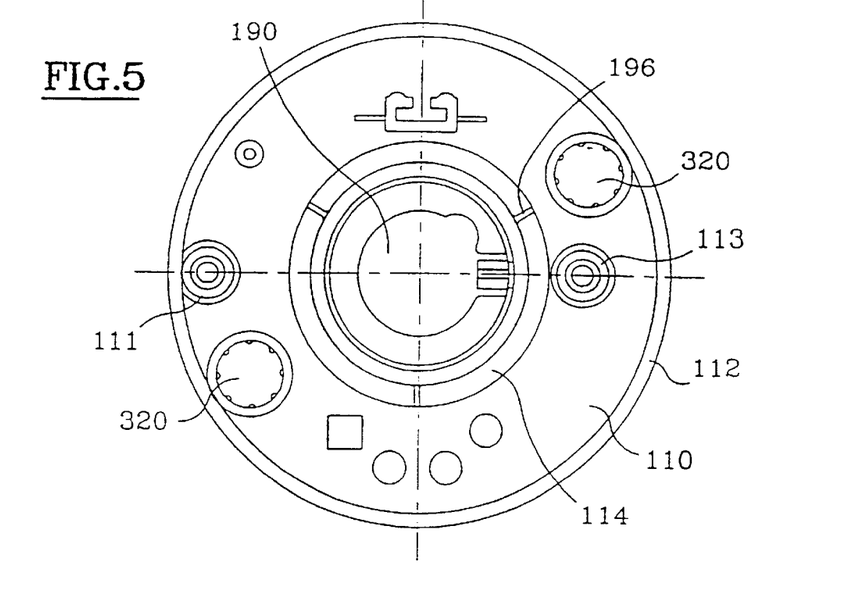
FIG. 5 depicts a view from above of a cover of a housing according to the present invention.
Figure 6:
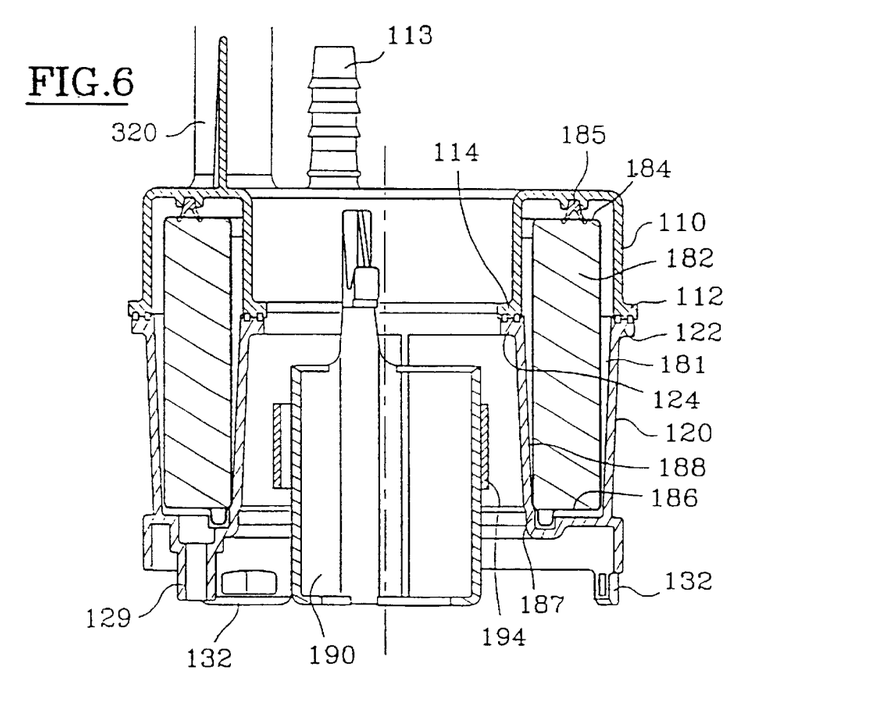
FIG. 6 depicts a view in vertical section of a housing according to the present invention.

The pump 190 is placed in the central space defined by the body-120/cover-110 assembly. The pump 190 is thus preferably elastically supported by the body 120. For that, the pump 190 is advantageously placed in an annular cage 194 connected to the radially internal wall of the body by damping means 196. These have been sketched in schematically in FIG. 5. They may be embodied in one of a number of ways.

The bowl 130 fixed to the base of the body 120 is intended to constitute a positive reserve of fuel for the pump 190.

The inlet 191 of the-pump 190 is therefore immersed in this bowl 130. The inlet 191 of the pump 190 is equipped, in a way known per se, with a filtering suction strainer 193.

The bowl 130 is fixed to the base of the pump 120 by any appropriate means such as by clip-fastening tabs 132 molded integrally on the base of the body 120 and engaging with complementing teeth 134 integral with the bowl 130, for example.

The bowl 130 may be fitted, in its bottom wall 133, with a conventional valve 140 known per se to allow the bowl 130 to be filled when the fuel level in the tank is above the fuel level in the bowl 130, but prevent the bowl 130 from emptying when the case is the opposite.

A valve 140 of this kind may be embodied in one of many ways known per se and will therefore not be described in detail hereinafter.

It will, however, be noted that the valve 140 preferably has the overall shape of a mushroom, the horizontal head of which rests on the upper surface of the base wall of the bowl 130 and the stalk of which is engaged in a passage passing through this wall, to allow this valve 140 to move vertically.

In addition, in the context of the present invention, additional means for filling the bowl 130 are preferably provided. These means are preferably formed of a jet pump 150 driven by the high pressure obtaining in the inlet chamber 181 of the filter 180.

Figure 11:
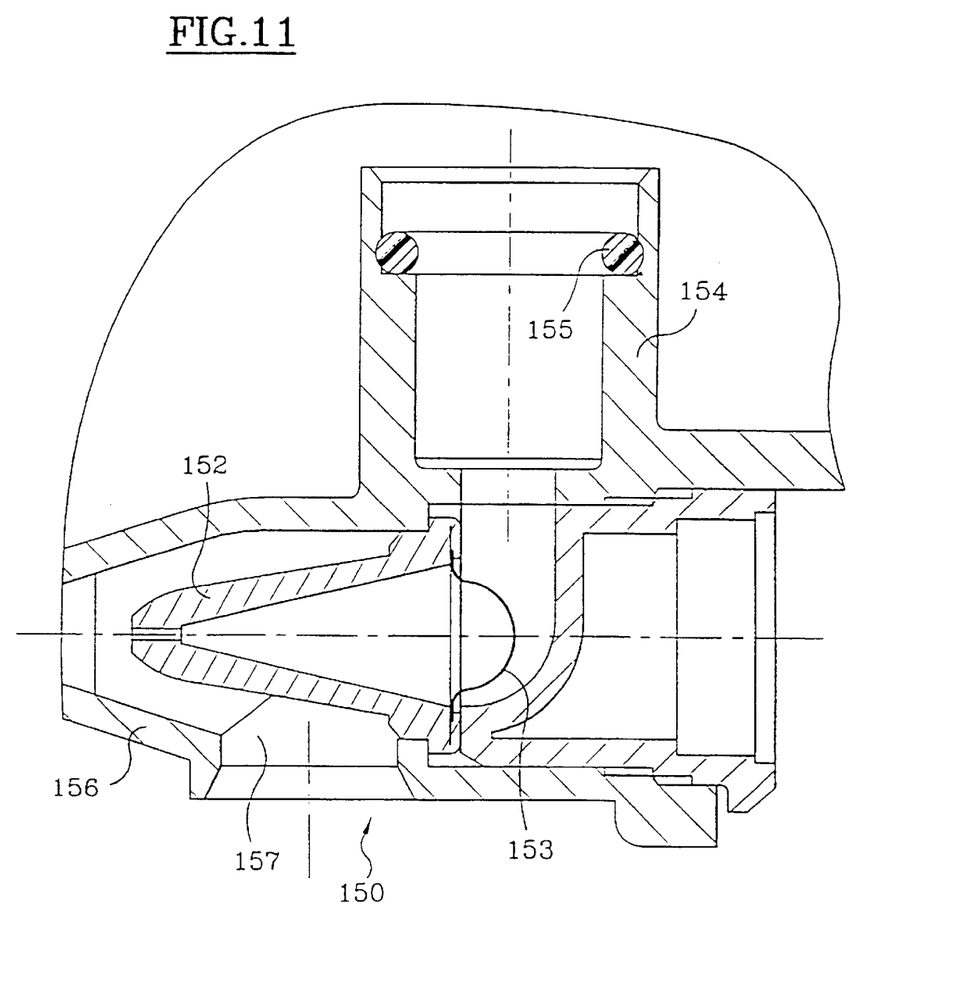
FIG. 11 depicts a view in vertical section of a jet pump fitted to the housing according to the present invention.

FIG. 11 illustrates a preferred but nonlimiting embodiment of such a jet pump 150.

FIG. 11 shows a horizontal nozzle 152 equipped with an inlet filter 153 which communicates via a vertical pipe 154 equipped with an annular seal 155, with a nozzle 129 molded integrally on the bottom wall of the body 120 and connected to the chamber 181.

Those skilled in the art will realize that arranging the filter 180 in the chamber external to the housing 100 makes it easier for the jet pump 150 to be supplied directly via the nozzle 129 molded integrally on the body 120.

The nozzle 152 opens opposite the throat of a Venturi 156, the inlet of which communicates via a passage 157 with the volume of the tank. Thus, the depression created in the throat 156 by the flow of fuel leaving the nozzle 152 and originating from the high-pressure chamber 181, draws fuel through the passage 157 and directs it toward the bowl 130.

To prevent the bowl 130 from emptying through the passage 157, at rest, the throat 156 preferably communicates with a vertical pipe which opens into the bowl 130 at a level equal to the height of this bowl 130.

It is to be noted that, whereas in many known systems, when the pump is running dry the latter pressurizes, and thereby heats, the outlet circuit, because the pressure regulator connected to this outlet circuit is closed, the presence of the jet nozzle 152 connected directly to the inlet chamber 181 of the filter, that is to say to the outlet of the pump 190, makes it possible, in the context of the present invention, for the pump outlet circuit to be vented by this jet nozzle 152, in the event of dry running, and to thereby prevent the pressurizing of this outlet circuit and consequently prevent inadvertent heating of the pump.

According to another advantageous feature of the present invention, means are provided for grounding the metallic end plates 184, 186 of the filter 180.

Figure 8:
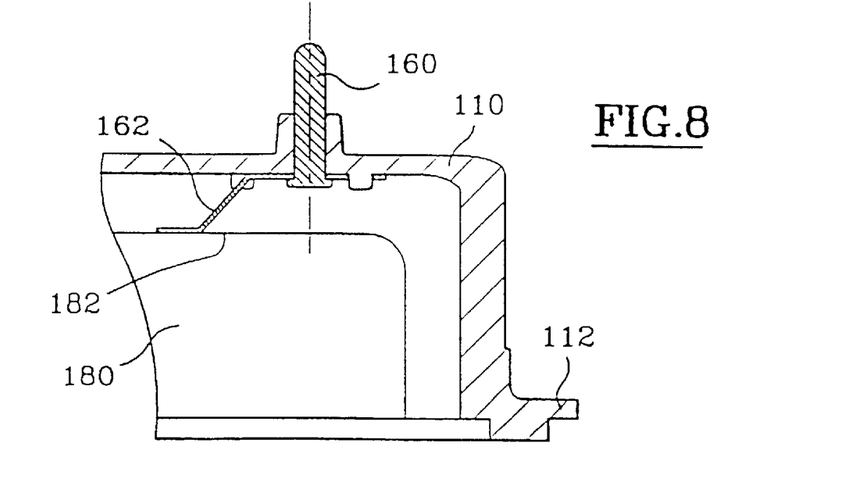
FIG. 8 depicts another part view in vertical section of the housing according to the present invention, illustrating a grounding contact associated with the filter.
Figure 9:
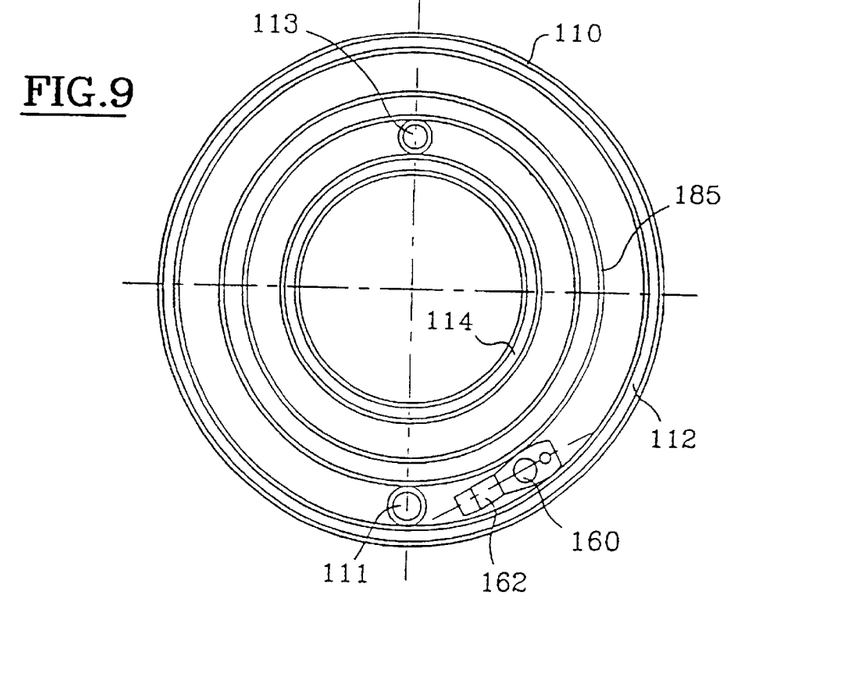
FIG. 9 illustrates a view from the underside of the cover fitted with this contact.
Figure 10:
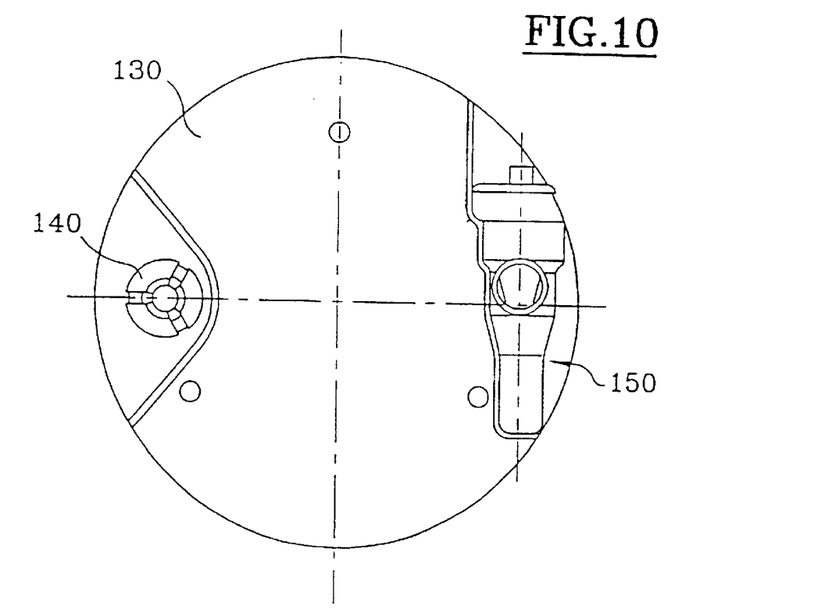
FIG. 10 illustrates a view from the underside of the housing according to the present invention.

According to the embodiment illustrated in the appended figures, these grounding means are formed of an electrically conducting stud 160 which passes in leaktight fashion through the upper wall of the cover and which is electrically connected to an elastic leaf 162, which is also electrically conducting, clipped onto pegs molded integrally on the internal face of the cover and resting elastically on the top end plate 184.

The stud 160 is itself connected by a socket and a wire, not depicted in the appended figures, to a grounding terminal available at the connector 210.

The level detector 400 essentially comprises a housing 410 borne by the upper wall of the cover 110 and which houses a small plate 420 fitted with a resistive track along which there moves a slider 430 actuated by an arm 440 connected to a float 450.

Of course, the present invention is not restricted to the embodiment which has just been described but covers all alternative versions that are in accordance with its spirit.

If appropriate, a seal may be formed between the upper edge of the bowl 130 and the lower edge of the housing 100, more specifically of the body 120, so as to enjoy a dynamic reserve with vehicle driving along, consisting of the entire volume formed by the bowl 130 and the central volume of the housing 100.

Figure 12:
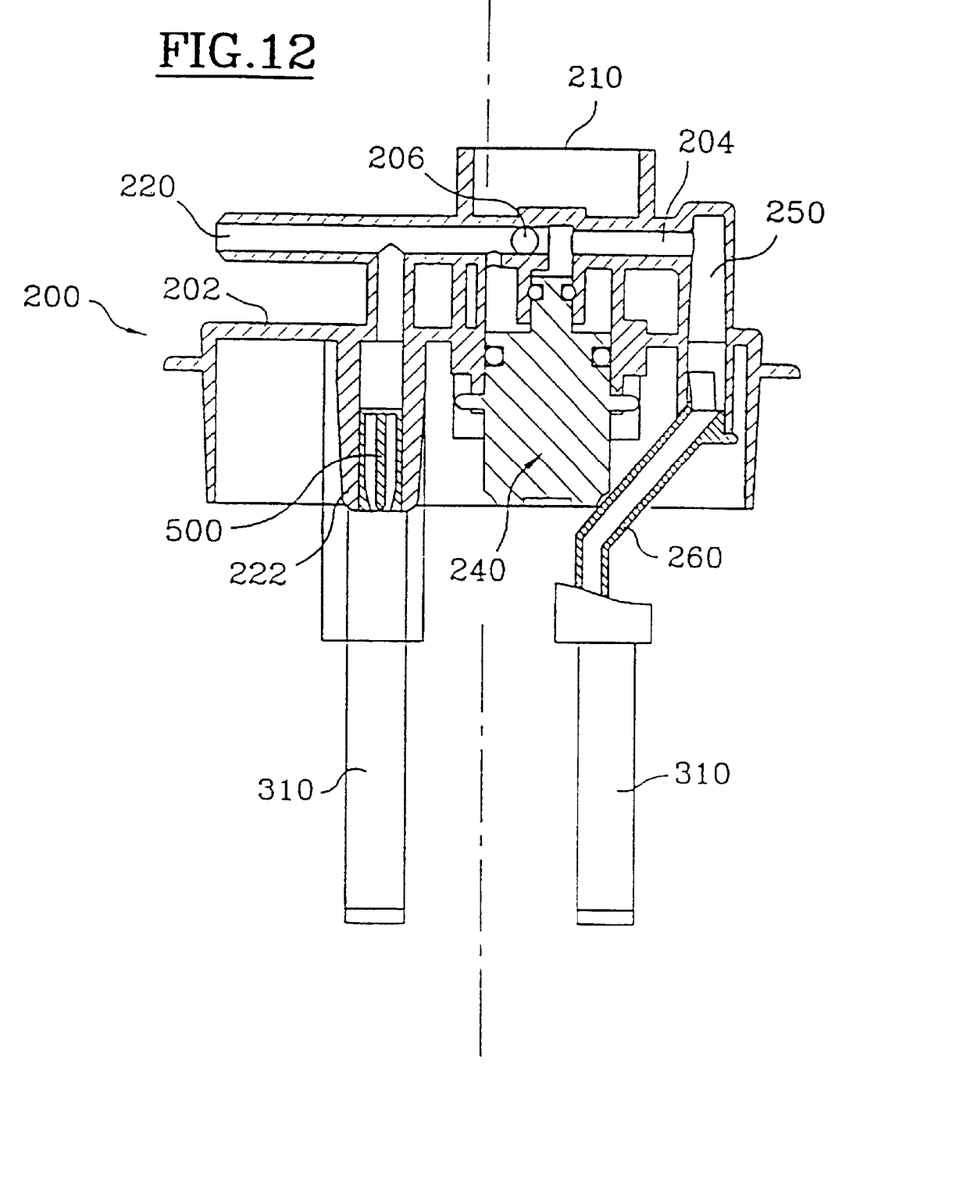
FIG. 12 depicts a diagrammatic view, in vertical part section, of a base according to the present invention.

Incidentally, the appended FIG. 12 shows a nonreturn valve 500 placed on a nozzle 222 molded integrally on the underside of the base 200. This nozzle 222 takes the upper end of the pipe 230 leading from the filter outlet. What is more, the nozzle 222 is connected to the outlet nozzle 220 of the base and to the inlet of the regulator 240.

The arrangement of the nonreturn valve 500 in the nozzle 222 formed on the base makes it possible to improve the sealing of the system compared with conventional arrangements which consist in incorporating the nonreturn valve into the pump housing. It will also be noted in FIG. 12 that the outlet nozzle 220 extends parallel to the upper wall 202 of the base 200 and coaxially with a secondary pipe 204 of smaller cross section connecting the outlet of the regulator 240 and the pipe 250 returning excess fuel to the reserve bowl. This coaxial arrangement of the pipes 204 and 220 makes the base incorporating the aforementioned products easier to produce by molding as one part.

However, the pipes 204 and 220 must of course be sealed from one another.

According to the embodiment illustrated in FIG. 12, this sealing is achieved by a ball 206 placed in a partition demarcating the pipes 204 and 220.

What is claimed is:

1. A fuel-drawing device for a motor vehicle tank comprising:

a housing having a withdrawing pump and a filter, said filter coupled to an outlet pipe of the withdrawing pump and positioned external to the housing, said withdrawing pump positioned within a central space of the filter; and a jet pump to fill a reserve bowl coupled to the withdrawing pump, said withdrawing pump coupled to a vibration damper in the central space, said housing having a nozzle on an interior wall of the housing, said nozzle coupling an inlet of the filter and a jet nozzle of the jet pump.

2. The device according to claim 1, wherein said housing includes a body surrounded by a cover.

3. The device according to claim 2, wherein said reserve bowl is coupled to the a base of the body.

4. The device according to claim 2, wherein each of said body and said cover includes an opening about which an outwardly projecting flange runs, each said flange to seal an internal chamber defined by the body and the cover.

5. The device according to claim 2, wherein said cover is coupled to said body by vibration welding.

6. The device of claim 5 wherein said cover and said body include complementary matching annular ribs coupled by said by vibration welding.

7. The device of claim 1, wherein said filter includes a radial-flow filter element placed between an upper end plate and a lower end plate.

8. The device of claim 7 further comprising means for grounding said upper end plate and said lower end plate.

9. The device of claim 8 wherein said grounding means includes an electrically conducting stud passing through an upper wall of the housing in a leaktight manner, said stud electrically connected to an electrically conducting elastic leaf which rests elastically on one of said end plates of the housing.

10. The device of claim 2 wherein said cover is coupled to said body at a mid-portion of the housing.

11. The device of claim 3, wherein said reserve bowl and said housing are sealingly coupled.

12. The device of claim 1 further comprising:

a base having an inlet nozzle; and a nonreturn valve coupled to said inlet nozzle, said base to be fixed to a wall of the tank.

13. The device of claim 12 wherein said base comprises:

a first pipe coupled to a second pipe; and a ball to seal said first pipe from said second pipe.

14. The device of claim 13 wherein said first pipe provides a connection between the outlet of a regulator and a third pipe returning to the reserve bowl, said second pipe to act as an outlet to a site where fuel is to be used.

* * * * *